US012698656B2

(12) United States Patent
Kruk et al.

(10) Patent No.: US 12,698,656 B2
(45) Date of Patent: Aug. 4, 2026

(54) CHARGING FLAP ARRANGEMENT FOR A MOTOR VEHICLE

(71) Applicant: BOS GmbH & Co. KG, Ostfildern (DE)

(72) Inventors: Jaroslaw Kruk, Esslingen (DE); Christian Schreck, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 19/044,898

(22) Filed: Feb. 4, 2025

(65) Prior Publication Data

US 2025/0250826 A1 Aug. 7, 2025

(30) Foreign Application Priority Data

Feb. 7, 2024 (DE) .......................... 102024103356.8

(51) Int. Cl.
| | |
|---|---|
| *E05B 83/34* | (2014.01) |
| *B60L 53/16* | (2019.01) |
| *E05F 15/63* | (2015.01) |

(52) U.S. Cl.
CPC .............. *E05B 83/34* (2013.01); *B60L 53/16* (2019.02); *E05F 15/63* (2015.01); *E05Y 2900/534* (2013.01)

(58) Field of Classification Search
CPC .......... E05B 83/34; E05F 15/63; B60L 53/16
See application file for complete search history.

(56) References Cited

U.S. PATENT DOCUMENTS

| | | | | |
|---|---|---|---|---|
| 2,505,637 | A | * 4/1950 | Chase ................ | B60K 15/0406 |
| | | | | 220/292 |
| 4,330,958 | A | * 5/1982 | Richmond ............ | E05B 47/026 |
| | | | | 49/340 |
| 4,625,455 | A | * 12/1986 | Harris ...................... | E05F 15/63 |
| | | | | 49/281 |
| 2010/0156118 | A1* | 6/2010 | Codeluppi .......... | E05B 47/0696 |
| | | | | 292/52 |
| 2016/0121746 | A1* | 5/2016 | Takahashi ................. | E05D 3/06 |
| | | | | 49/242 |
| 2022/0290476 | A1* | 9/2022 | Hegwein ................. | E05B 81/42 |
| 2023/0061574 | A1* | 3/2023 | Mensch ..................... | E05F 1/10 |

FOREIGN PATENT DOCUMENTS

| | | | |
|---|---|---|---|
| DE | 102018220347 | * | 3/2020 |
| FR | 2717210 | * | 9/1995 |
| FR | 2765836 | * | 1/1999 |
| FR | 2859694 | * | 3/2005 |
| KR | 10-2249860 | * | 5/2021 |

* cited by examiner

*Primary Examiner* — Gregory J Strimbu
(74) *Attorney, Agent, or Firm* — FLYNN THIEL, P.C.

(57) ABSTRACT

A charging flap arrangement for a motor vehicle with a charging flap movable between a closed position and an open position relative to a charging recess fixed to the vehicle, via a multi-joint kinematic mechanism, and with a drive system for actuating the multi-joint kinematic mechanism. An additional mechanical lock is provided between the charging flap and the charging recess, and is mechanically force-coupled to the multi-joint kinematic mechanism such that the additional lock is, shortly before reaching the closed position of the charging flap, forcibly moved into a locked position in which the charging flap is positively locked at at least one edge section of the charging flap relative to an adjacent edge area of the charging recess.

12 Claims, 3 Drawing Sheets

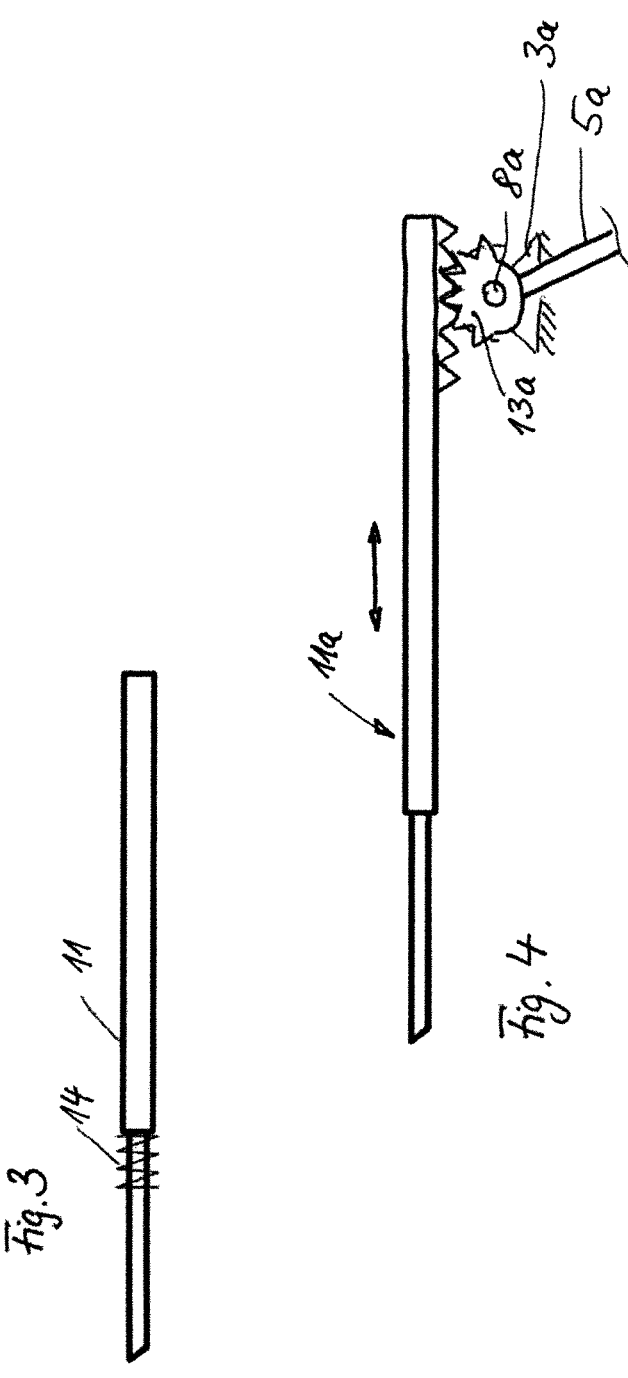

CHARGING FLAP ARRANGEMENT FOR A MOTOR VEHICLE

CROSS-REFERENCE TO RELATED APPLICATION

This claims priority from German Application No. 102024103356.8, filed Feb. 7, 2024, the disclosure of which is hereby incorporated by reference in its entirety.

TECHNICAL FIELD

The invention relates to a charging flap arrangement for a motor vehicle, with a charging flap which is movable between a closed position and an open position relative to a charging recess, fixed to the vehicle, by means of a multi-joint kinematic mechanism, and with a drive system for actuating the multi-joint kinematic mechanism.

BACKGROUND AND SUMMARY

A charging flap arrangement of this type for an electric motor-powered motor vehicle is generally known. The known charging flap arrangement has a charging flap which is movably mounted by means of a multi-joint kinematic mechanism on the vehicle side. In a closed position, the charging flap closes off a vehicle-side charging recess in which at least one electric charge port is arranged for charging a battery on the vehicle side. In the open position, the charging flap is moved outward, exposing the charging recess and the charge port, relative to an outer shell of a vehicle body. A drive system comprising an electric motor is provided for movement of the charging flap between its closed position and its open position.

One object of the invention is to provide a charging flap arrangement of the type stated at the outset that permits dependable use for passenger vehicles traveling at high speeds.

This is achieved in that an additional mechanical lock is provided between charging flap and charging recess, which is mechanically force-coupled to the multi-joint kinematic mechanism such that the additional lock is, shortly before reaching the closed position of the charging flap, forcibly moved into a locked position in which the charging flap is positively locked at least one edge section of the charging flap relative to an adjacent edge area of the charging recess. This results, for the closed position of the charging flap, in additional securing relative to the charging recess and hence relative to the vehicle body. The solution in accordance with the invention ensures that the charging flap is not unintentionally pulled out of its closed position by airstream flows even at high driving speeds of the motor vehicle, in particular of a passenger vehicle. Unplanned opening or even tearing off of the charging flap while the vehicle is traveling is thus dependably prevented by the invention. Since the lock in accordance with the invention is based on a purely mechanical solution, the charging flap is kept in its closed position even if the vehicle electrics fails. Additional locking may be achieved with a single locking bolt, with several locking elements synchronously coupled to one another, or also with a rotatably movable locking element. The drive system preferably has an electric motor fastened on the vehicle side, which acts on the multi-joint kinematic mechanism by means of a suitable transmission, in particular a gear transmission. A four-joint kinematic mechanism is preferably provided as the multi-joint kinematic mechanism. Particularly advantageously, the multi-joint kinematic mechanism is designed such that the charging flap is not moved permanently in parallel to the vehicle outer shell between its open position and its closed position, but moves obliquely with a first edge section closer to the edge area of the charging recess, in order to then ensure by means of an over-center kinematic mechanism that the charging flap is pulled with its other edge section into the closed position. The over-center kinematic mechanism ensures particularly dependable securing of the charging flap relative to the vehicle-side charging recess in its closed position. Advantageously, an all-round elastically yielding seal is provided between the charging flap and the charging recess to ensure additional securing and support of the charging flap in its closed position.

In an embodiment of the invention, the multi-joint kinematic mechanism has a lever arm drivable by the drive system and having a forced coupling member co-rotating with the lever arm for forced coupling to the additional lock in the area of a swivel joint fixed to the charging flap, said forced coupling member being movable into an operative connection to the additional lock in a force transmitting manner depending on the swivel position of the lever arm. The lever arm is mounted on the charging flap in a rotatably movable manner by means of the swivel joint. In addition, the lever arm is mounted in rotatably movable manner in the area of the drive system on the vehicle side. A rotation of the lever arm relative to the charging flap also forces the forced coupling member to rotate due to the co-rotating association of the forced coupling member with the lever arm. Since the additional lock however is not to be moved into the locked position until the end of the closing movement of the charging flap, a rotary movement of the forced coupling member over part of the swivel movement of the lever arm has no effect in respect of additional locking. The forced coupling member practically performs an idle movement for this part of the swivel movement.

In a further development of the invention, a thrust piece or an eccentric or a gear segment or a similar force transmitting member is provided as the forced coupling member. A threaded screw nut may also be provided as the force transmitting member. With such a variant, the additional lock is preferably formed by at least one threaded screw, which is axially moved by a screw movement when the screw nut is rotated.

In a further development of the invention, the additional lock is arranged on the loading flap. Underneath the additional lock, a movably arranged unit is provided on the charging flap between a locked position and a release position. A suitable matching part ensuring positive locking is provided on an edge area of the charging recess fixed to the vehicle.

In a further embodiment of the invention, a rotary movement of the lever arm and a transmission of force from the forced coupling member to the additional lock are synchronized with one another such that the additional lock is not moved into the locked position until an edge section of the charging flap adjacent to the additional lock comes into contact with an edge area of the charging recess during the closing movement of the charging flap. This embodiment is used with a multi-joint kinematic mechanism, where the all-round edge of the charging flap does not contact the edge of the charging recess at the same time, but instead the charging flap initially comes into contact with the charging recess, with an angled alignment, by one edge section of the charging flap during a closing movement, before the remaining part of the charging flap is then pulled inwards to the charging recess. As a result, the additional lock is advantageously already activated during the closing movement, wherein it must be ensured that the additional lock is not yet in its locked position while the edge section of the charging flap adjacent to the additional lock is not yet in contact with the charging recess.

In a further embodiment of the invention, the additional lock has at least one locking bolt mounted in linearly movable manner on the loading flap. The locking bolt may be moved between the locked position and the release position by a simple axial movement. Alternatively, the locking bolt may be guided on the charging flap in linearly movable manner by a screw movement.

In a further embodiment of the invention, the locking bolt is permanently spring-loaded by a reset spring in the direction of its unlocked position. This embodiment is advantageous with a purely axial movability of the locking bolt. The permanent spring loading in the direction of the unlocked position ensures that when the drive system is activated to move the charging flap out of the closed position into the open position, the locking bolt is moved automatically into the unlocked position.

In a further embodiment of the invention, the edge area of the charging recess has a locking receptacle complementary to the locking bolt. In the locked position, the locking bolt slides into this locking receptacle.

Further advantages and features of the invention are revealed by the claims and by the following description of preferred exemplary embodiments of the invention, these being explained with reference to the drawings.

BRIEF DESCRIPTION OF THE DRAWINGS

FIG. 3 an additional lock in the form of a locking bolt of the charging flap arrangement according to FIGS. 1 and 2.

FIG. 4 schematically a further locking bolt similar to FIG. 3 for a further embodiment of a charging flap arrangement in accordance with the invention.

DETAILED DESCRIPTION

Figure 1:
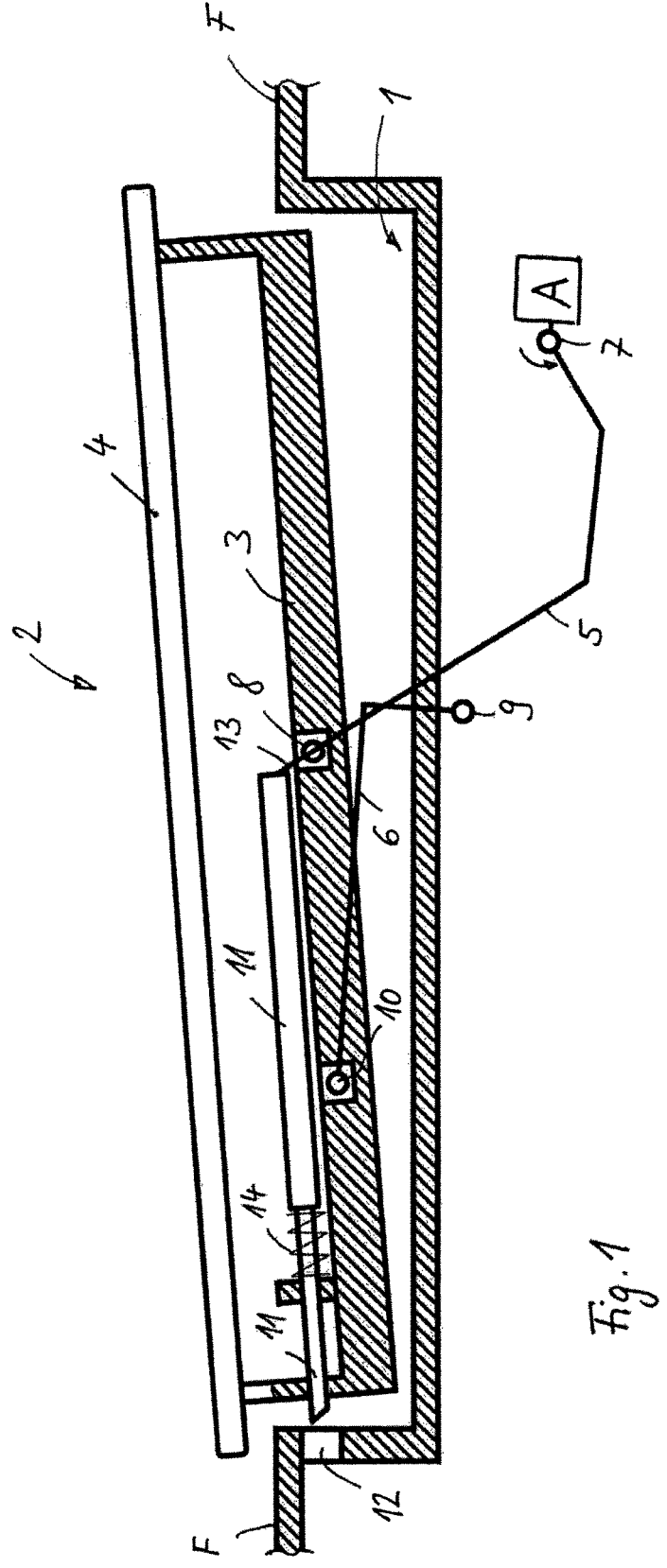
FIG. 1 shows schematically in a longitudinal section an embodiment of a charging flap arrangement in accordance with the invention in a still partially open intermediate position of a loading flap.

A passenger vehicle is equipped, in a manner not shown in detail, with an electric drive which is supplied with current by a vehicle-side battery system. For charging the battery system with current, an electric charge port is provided in the area of an outer side of the vehicle and is accommodated, in a manner not shown in detail, in a charging recess 1 fixed to the vehicle. The charging recess 1 is provided in the area of an outer vehicle contour F and surrounds the electric charge port in a manner not shown. To cover the electric charge port, a charging flap 2 is provided which is movable between a closed position (FIG. 2) and a release position, not shown, relative to the charging recess 1. In the closed position, the charging flap 2 closes off the charging recess 1. Preferably, the charging flap 2 is in its closed position flush with an outer bodywork shell of the vehicle body F. The charging flap 2 is mounted movably relative to the vehicle-side charging recess 1 between the closed position and the release position by means of a multi-joint kinematic mechanism, in the present case by means of a four-joint kinematic mechanism. The four-joint kinematic mechanism is drivable by a drive system A in order to move the charging flap 2. The four-joint kinematic mechanism has here a first lever arm 5, forming a lever arm 5 on the drive side and driven directly by the drive system A. The drive system A has, in a manner not shown in detail, an electric motor and an associated transmission acting on the lever arm 5. The lever arm 5 is pivotally mounted on one side about a swivel joint 7 fixed to the vehicle in the area of the drive system and on the other side about a swivel joint 8 arranged on the charging flap 2. The joint on the charging flap side is provided on a carrier part 3 of the charging flap 2. The corresponding swivel joint 8 is arranged stationary on the carrier part 3.

The charging flap 2 also has a flap cover 4 fastened on the outside of the carrier part 3. The flap cover 4 may be matched in its design and color to the outer bodywork shell.

The other, non-driven lever arm 6 has a swivel joint 9 fixed to the vehicle in the area of the charging recess 1, and a swivel joint 10 on the charging flap side which is arranged in the carrier part 3 of the charging flap 2. The driven lever arm 5 and the non-driven lever arm 6 are associated with one another with their articulation points defined by the swivel joints 7 to 10, such that in the closed position of the charging flap 2 an over-center position results which forms a secure retention of the charging flap 2 in the closed position.

Between the release position and the closed position, the charging flap 2 is not moved continuously parallel relative to an outer bodywork shell by means of the four-joint kinematic mechanism, as can be seen in FIG. 1. Instead, one edge section, on the left in FIGS. 1 and 2, of the charging flap 2 moves into an end position at the associated edge area of the charging recess 1, before the opposite edge section of the charging flap 4 contacts the opposite edge area of the charging recess 1, by a suitably inclined positioning of the charging flap 2.

To ensure additional securing relative to the charging recess 1 for the charging flap 2 in its closed position, an additional lock is provided which is formed by a locking bolt 11 mounted in a linearly movable manner in the charging flap 2, with which a locking receptacle 12 provided on the left-hand edge area of the charging recess 1 is associated as a matching part. The locking bolt 11 has a locking tip which, in a locked position of the additional lock, slides into the locking receptacle 12 of the charging recess 1. The locking bolt 11, representing a locking member in the meaning of the invention, is permanently spring-loaded in the direction of its release position (FIG. 1) by a reset spring 14 also arranged on the charging flap 2. In a locked position, the locking bolt 11 has been moved to the left (FIG. 2) and forms with its locking tip, which slides into the locking receptacle 12, a positive lock of the edge section, on the left in FIGS. 1 and 2, of the charging flap 2. This edge section, on the left in FIGS. 1 and 2, of the charging flap 2 is an edge section remote from the drive system A and from the driven lever arm 5. It can be seen in FIGS. 1 and 2 that the driven lever arm 5 extends approximately from the center of the carrier part 3, i.e. starting from the swivel joint 8, to the swivel joint 7 fixed to the vehicle, in the direction of a right-hand edge area of the charging recess 1. Since the articulation point of the other lever arm 6 formed by the swivel joint 10 is, starting from the left-hand edge section of the charging flap 2, offset relative to the center, forces acting on the left-hand edge section of the charging flap 2 could, without the aforementioned additional lock, pull the left-hand edge section of the charging flap 2 outwards, resulting in the charging flap 2 being opened and possibly coming loose from the vehicle. Such forces may occur due to wind flows during driving, which are caused by the airstream flowing along the outer bodywork shell. The additional lock eliminates this weak spot, in that additional locking is achieved for this area between the charging flap 2 and the charging recess 1.

To effect particularly simple and synchronized actuation of the additional lock, i.e. of the locking bolt 11, the lever arm 5 has, in the area of the swivel joint 8, a co-rotating extension 13 that contacts a rear end face of the locking bolt 11. This lever extension 13, which forms a forced coupling member in the meaning of the invention, does not contact the end face of the locking bolt 11 in order to exert a pressure on the locking bolt 11 until the charging flap 2 is in the position shown in FIG. 1. Between the intermediate position shown in FIG. 1 and the closed position shown in FIG. 2, the lever arm 5 at the charging-flap-side swivel joint 8 keeps rotating counter-clockwise by a small distance, as a result of which a pressure is exerted outwards on the end face of the locking bolt 11, against the resetting force of the reset spring 14. As a result, the locking bolt 11 moves into the locked position. The pressure exerted by the lever extension 13 is maintained in the closed position until the drive system A is operated in the reversed direction, in order to move the charging flap 2 out of the closed position back in the direction of the release position. The pressure exerted by the lever arm 13 on the end face of the locking bolt 11 leads to an axial movement of the locking bolt 11 in the direction of the locking receptacle 12 and into this locking receptacle 12. Since the locking tip is not moved in the direction of the locking receptacle 12 until the edge section, on the left in FIGS. 1 and 2, of the charging flap 4 has reached its end position which is in contact with the edge area of the charging recess 1, the locking tip of the locking bolt 11 is already aligned with this locking receptacle 12, so that the required locking process is achievable. In conjunction with the over-center position, into which the four-joint kinematic mechanism is moved in the closed position of the charging flap 2, the result is that the charging flap 12 is secured relative to the charging recess 1 sufficiently to withstand even high driving speeds of the passenger vehicle.

Figure 2:
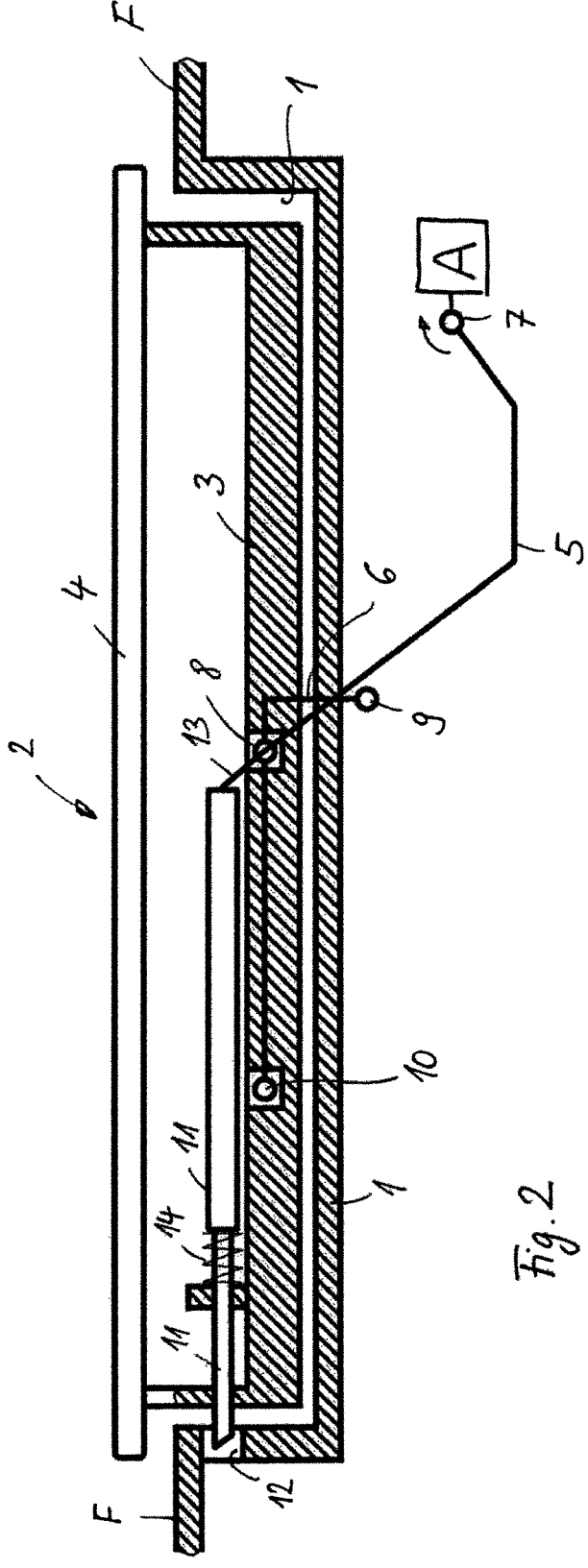
FIG. 2 the charging flap arrangement according to FIG. 1, but in a closed position.

In the embodiment according to FIG. 4, the charging flap arrangement is designed substantially identically to the embodiment according to FIGS. 1 and 2, so that reference is made to the description and to the drawings of the charging flap arrangement according to FIGS. 1 and 2 to avoid repetition. The sole difference in the charging flap arrangement according to FIG. 4 is that a lever extension 13 as in FIGS. 1 and 2 is not provided as the forced coupling member, but instead a gear segment 13a. In this embodiment according to FIG. 4, functionally identical components or sections are provided with the same reference numerals, however with the letter 'a' added.

For a comparison of the differences, FIG. 3 shows once again in schematic form the locking bolt 11 with the reset spring 14 from the charging flap arrangement according to FIGS. 1 and 2. It can be seen in FIG. 4 that the driven lever arm 5a has a gear segment 13a, coaxial to a rotary axis of the swivel joint 8a, which meshes with a rack section of the locking bolt 11a which is firmly arranged on the locking bolt 11a. The rack section is not indicated in detail. The carrier part 3a too of the charging flap 2 is only shown schematically, to illustrate the mounting of the swivel joint 8a on the carrier part 3a of the charging flap. The gear segment 13a is held co-rotatingly with the lever arm 5a on the swivel joint 8a. The embodiment according to FIG. 4 does not need a reset spring, since the gear segment 13a in conjunction with the rack section on the locking bolt 11a is effective both in the direction of the locked position and in the direction of the unlocked position. The design of the gear segment 13a and also of the rack section is only schematically illustrated. It is the case in this embodiment too that the gear segment 13a must not come into force-transmitting contact with the rack section of the locking bolt 11a until the lever arm 5a has already moved the charging flap 2 into the inclined intermediate position according to FIG. 1, in which the left-hand edge section of the charging flap 2 has already reached its end position relative to the adjacent edge area of the charging recess 1.

The invention claimed is:

1. A charging flap arrangement for a motor vehicle having a charging recess fixed thereto, comprising:
   a charging flap movable between a closed position at least partially disposed within the charging recess and an open position relative to the charging recess fixed to the vehicle and having a peripheral edge and an edge section forming part of the peripheral edge;
   a multi-joint kinematic mechanism connecting the charging flap to the charging recess;
   a drive system for actuating the multi-joint kinematic mechanism; and
   an additional mechanical lock disposed to act between the charging flap and the charging recess, the additional mechanical lock being mechanically force-coupled to the multi-joint kinematic mechanism such that the additional mechanical lock is, before the charging flap reaches the closed position, forcibly moved into a locked position by the multi-joint kinematic mechanism, the edge section of the charging flap, when the additional mechanical lock is in the locked position, locked to an adjacent edge area of the charging recess by the additional mechanical lock.

2. The charging flap arrangement according to claim 1, wherein the multi-joint kinematic mechanism has a lever arm drivable by the drive system, and a forced coupling member co-rotating with the lever arm for forced coupling with the additional mechanical lock in an area of a swivel joint fixed to the charging flap, said forced coupling member being movable into an operative connection with the additional mechanical lock in a force transmitting manner depending on a swivel position of the lever arm.

3. The charging flap arrangement according to claim 2, wherein the forced coupling member comprises a force transmitting member comprising a thrust piece or an eccentric element or a gear segment.

4. The charging flap arrangement according to claim 2, wherein a rotary movement of the lever arm and a transmission of force from the forced coupling member to the additional mechanical lock are synchronized with one another such that the additional mechanical lock is not moved into the locked position until the edge section of the charging flap, the edge section being disposed adjacent to the additional mechanical lock, comes into contact with the adjacent edge area of the charging recess during a closing movement of the charging flap.

5. The charging flap arrangement according to claim 1, wherein the additional mechanical lock is mounted on the charging flap.

6. The charging flap arrangement according to claim 5, wherein the additional mechanical lock has at least one locking bolt mounted in a linearly movable manner on the charging flap.

7. The charging flap arrangement according to claim 6, wherein the adjacent edge area of the charging recess has a locking receptacle complementary to the at least one locking bolt.

8. The charging flap arrangement according to claim 1, wherein the additional mechanical lock directly engages the adjacent edge area of the charging recess when in the locked position to lock the edge section of the charging flap to the adjacent edge area of the charging recess.

9. The charging flap arrangement according to claim 8, wherein the adjacent edge area of the charging recess includes a locking receptacle, and at least one locking bolt of the additional mechanical lock being engaged with the locking receptacle when the additional mechanical lock is in the locked position.

10. A charging flap arrangement for a motor vehicle, comprising:

a charging flap movable between a closed position and an open position relative to a charging recess fixed to the vehicle;

a multi-joint kinematic mechanism;

a drive system for actuating the multi-joint kinematic mechanism;

an additional mechanical lock acting between the charging flap and the charging recess and mounted on the charging flap, the additional mechanical lock being mechanically force-coupled to the multi-joint kinematic mechanism such that the additional mechanical lock is, before the charging flap reaches the closed position, forcibly moved into a locked position in which the charging flap is positively locked at at least one edge section of the charging flap relative to an adjacent edge area of the charging recess, the additional mechanical lock having at least one locking bolt mounted in a linearly movable manner on the charging flap; and a reset spring, the at least one locking bolt being permanently spring-loaded by the reset spring toward an unlocked position of the additional mechanical lock.

11. A charging flap arrangement for a motor vehicle having a charging recess defined in a body of the vehicle, the charging flap arrangement comprising:

a charging flap having an outer periphery defining a peripheral edge and an edge section forming part of the peripheral edge;

a multi-joint kinematic mechanism operatively connected to the charging flap and configured to move the charging flap between a closed position and an open position, the charging flap in the closed position being at least partially disposed within the charging recess and closing off the charging recess of the motor vehicle and in the open position allowing access to the charging recess of the motor vehicle, the multi-joint kinematic mechanism including a lever arm;

a drive system operatively connected to the multi-joint kinematic mechanism and the lever arm thereof for actuating the multi-joint kinematic mechanism; and a mechanical lock mounted on and movable relative to the charging flap and disposed to cooperate between the charging flap and an adjacent edge of the charging recess of the motor vehicle, the lever arm being disposed to transmit force to the mechanical lock such that the mechanical lock, before the charging flap reaches the closed position, is forcibly moved by the lever arm into a locked position with the adjacent edge of the charging recess of the motor vehicle, the edge section of the charging flap, when the mechanical lock is in the locked position, being locked to the adjacent edge of the charging recess by the mechanical lock.

12. The charging flap arrangement according to claim 11, wherein the lever arm has a first end portion pivotally connected to the motor vehicle for rotational movement relative thereto and a second end portion forming a lever arm extension, the lever arm extension being pivotally connected to the charging flap and rotating with the lever arm, the lever arm extension acting on the mechanical lock when the charging flap is in an intermediate position, the intermediate position of the charging flap being located between the open position and the closed position and closer to the closed position than to the open position.

* * * * *